April 25, 1933.    K. E. PEILER    1,905,495
APPARATUS FOR SUPPLYING MOLTEN GLASS
Filed May 21, 1931    3 Sheets-Sheet 1

Witness:
A. A. Horn

Inventor
Karl E. Peiler
by Brown & Parham
Attorneys.

April 25, 1933. K. E. PEILER 1,905,495
APPARATUS FOR SUPPLYING MOLTEN GLASS
Filed May 21, 1931 3 Sheets-Sheet 2

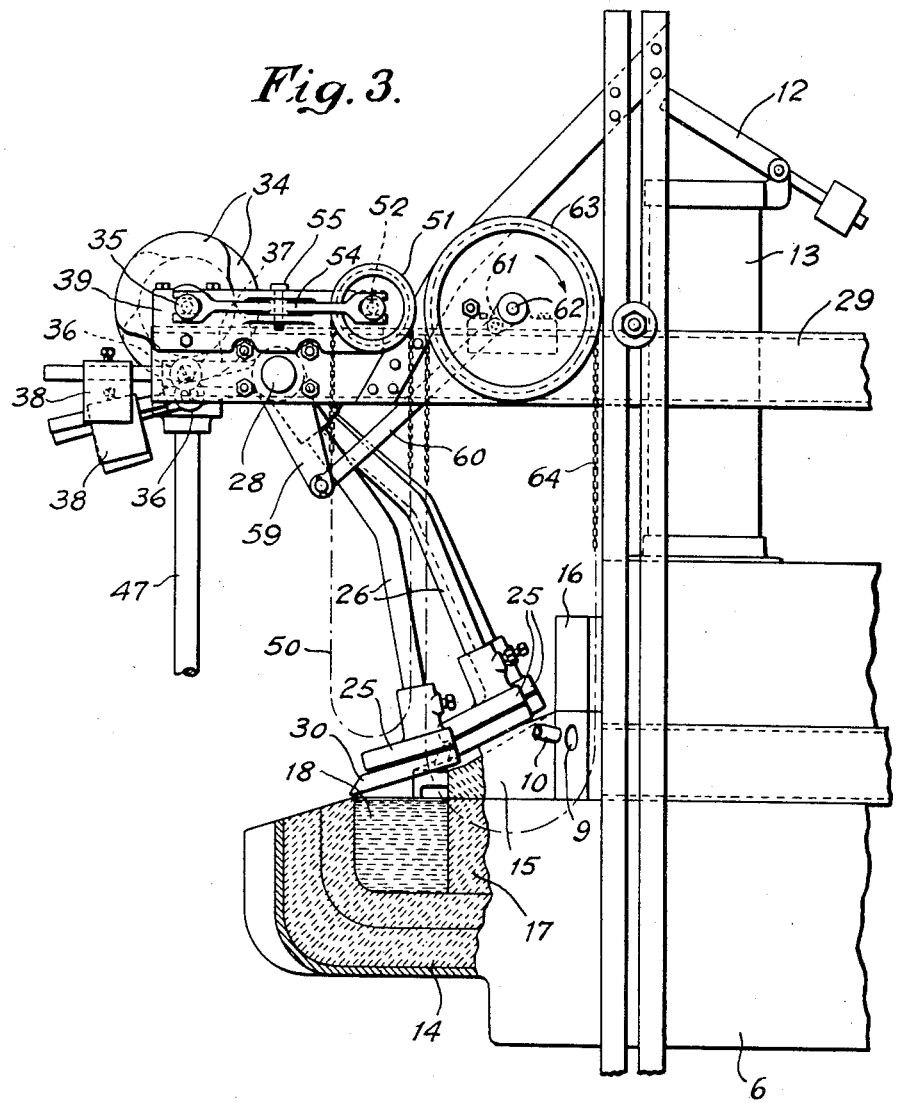
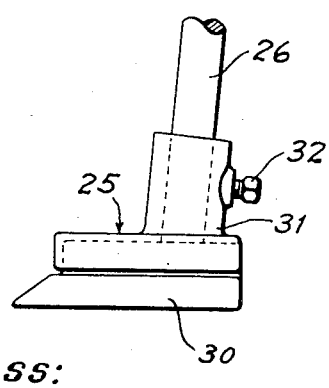
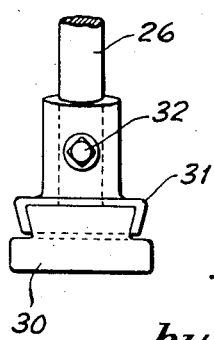

Patented Apr. 25, 1933

1,905,495

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR SUPPLYING MOLTEN GLASS

Application filed May 21, 1931. Serial No. 538,950.

This invention relates to apparatus for supplying molten glass and has particular relation to a construction for providing a pool of molten glass from the surface of which charges are gathered by suction in the molds of a glass forming machine.

Heretofore, difficulty has been experienced in maintaining the glass of a gathering pool in which charges are gathered by suction, at the proper temperature, and in the proper condition for the manufacture of glassware, because of the necessity of leaving a substantial portion of the pool exposed for free access of gathering molds thereto. That especially has been true in the employment of rotary suction machines, particularly those of the continuously rotating type, which usually require the provision of an opening of substantial length in the container for the pool of glass, resulting in the escape of an appreciable amount of heat which should be confined to the surface of the gathering pool to maintain the glass therein at the proper temperature and in a homogeneous condition.

It is the general object of this invention to provide novel means for conserving the heat applied to the part of a pool of glass in which charges are gathered, and for confining substantially the maximum amount of heat to the surface of that part of the pool for the above purposes, yet permitting free access to the pool at desired times for the gathering of the charges.

More specifically, it is an object of this invention to provide means of novel character which operates periodically to expose a gathering pool for molds to be dipped therein, but which causes the pool to be enclosed in the intervals between gathering operations, thereby confining the heat supplied to the gathering zone in the pool, and maintaining the glass in the gathering zone at the desired temperature and in good working condition in an unusually efficient manner. This object may be accomplished by means of a plurality of heat obstructing or cover members supported side by side for movement into and out of position to enclose that portion of the pool from which charges are gathered. The heat obstructing members may be moved in timed relation to the arrival of successive molds of the forming machine at the gathering position, and the passage thereof over the pool, so that an opening to the pool is provided which moves with each mold from one end of the gathering opening to the other in the direction of mold travel. Thus the members may successively be opened in advance of, and closed behind, each mold. By the provision of such means, the gathering pool is kept closed to the maximum extent, thereby confining the maximum amount of heat above the glass in the pool, especially at the gathering point, for the purpose of keeping the glass in good working condition.

In order that the invention may be better understood, and its several advantages appreciated, reference should be had to the accompanying drawings in which a convenient embodiment of the invention is illustrated.

In said drawings:

Fig. 3 is a view principally in side elevation but partially in vertical longitudinal section of a fragmentary part of the construction shown in Figs. 1 and 2; and Figs. 4 and 5 are enlarged views in side and rear elevation of one of the heat obstructing members embodied in the construction of Figs. 1 to 3.

Figure 1:
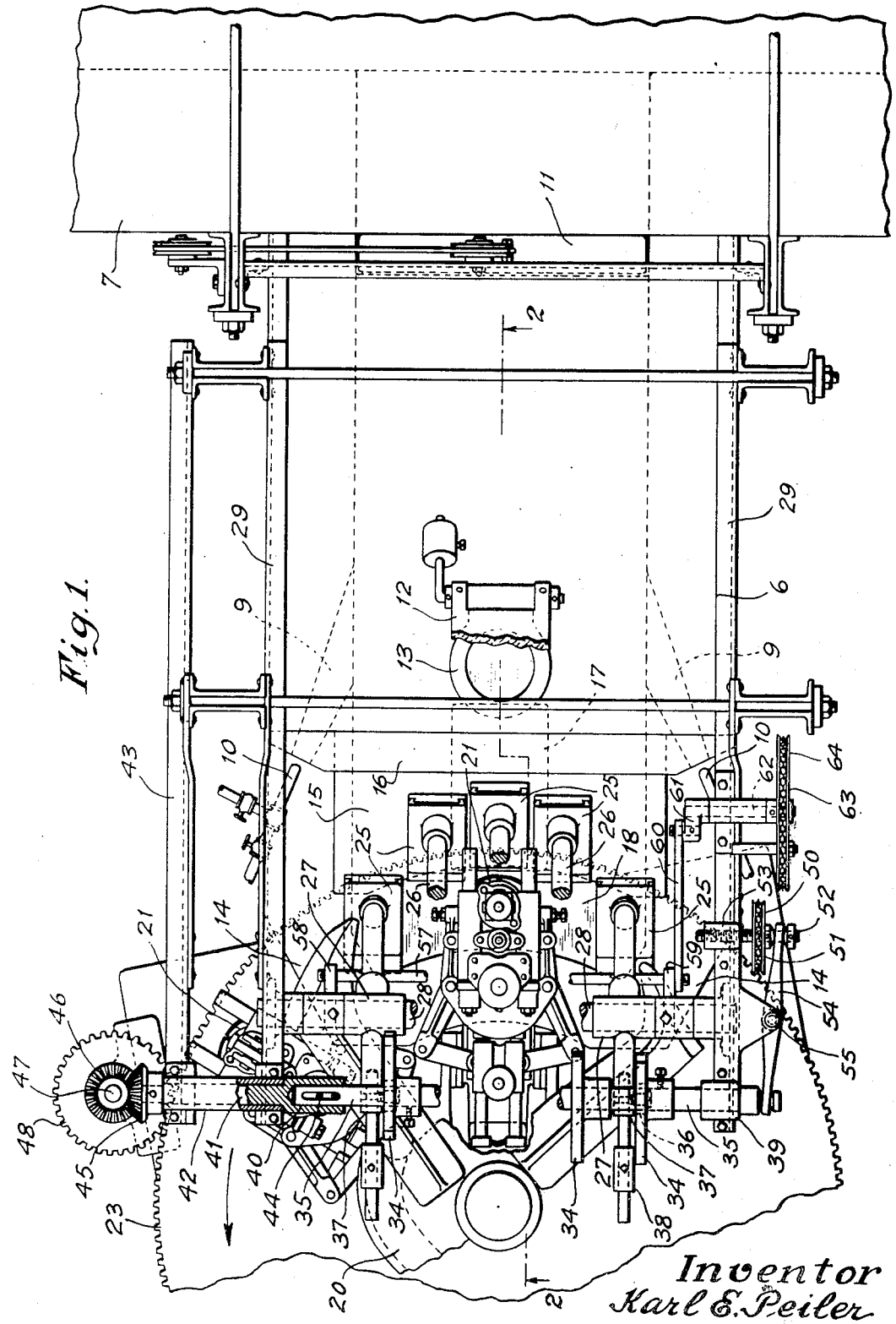
Figure 1 is a view in top plan of apparatus with which the invention is associated.
Figure 2:
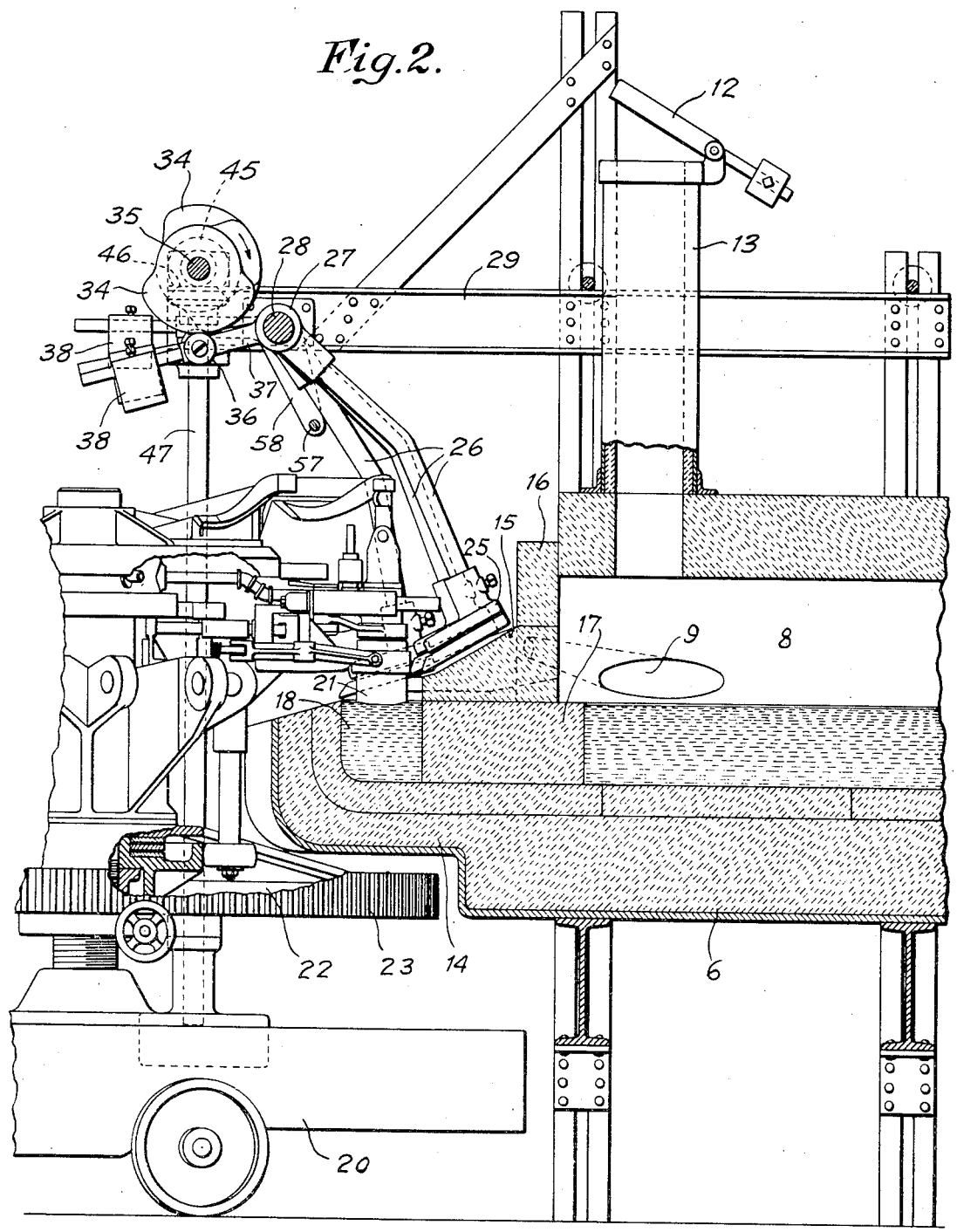
Fig. 2 is a view in longitudinal vertical section of the construction shown in Fig. 1 and taken substantially on the line 2—2 of Fig. 1.

Figs. 1 to 2 show a forehearth 6 which is connected to a suitable furnace or glass melting tank, a portion of which is indicated at 7. The forehearth 6 is enclosed to provide a heating chamber 8, Fig. 2, to which heat may be applied through ports 9, from burners 10. The heating chamber 8 of the forehearth may be separated from the heating space of the tank by means of an adjustable or vertically movable gate indicated at 11, Fig. 1. The provision of such a gate is of particular utility in permitting independent temperature control in the heating space in the forehearth independently of the temperature condition in the tank, and with the assistance of a damper 12 associated with the stack 13 arising from the front top portion of the heating chamber.

Near the front of the forehearth 6, the roof of the forehearth terminates to leave a bay or extension indicated generally at 14 and partially enclosed by a cover block 15. The cover block 15 supports the front wall 16 of the forehearth, said block resting at its ends on the sides of the extension 14, and being supported at its center by a refractory block 17 positioned centrally of the extension as shown in Fig. 1, and providing a U-shaped channel, the bend of which constitutes the gathering pool proper as indicated at 18, Figs. 1, 2 and 3. The portion 18 of the channel may be of arcuate shape to correspond to the circular path of travel of the molds of the forming machine designated generally at 20, and comprising a series of suction gathering molds, one of said molds being indicated at 21. The suction machine may be of a well-known continuous type and may comprise a table 22, having a ring gear 23 on the periphery thereof by means of which the machine is driven in suitable manner. It will be understood that the table 23 is rotated to periodically move the molds such as shown at 21 over the gathering pool, and to dip the molds into the glass for the gathering of charges.

In order to confine the heat which may flow from the heating chamber 8 outwardly over the gathering pool and beneath the cover block 15, the following means is provided.

A plurality of heat obstructing members 25 of rectangular shape, are supported side by side for movement into and out of position to enclose the portion 18 of the extension 14. The members 25 are carried by the bent arms 26 of bell cranks 27, rotatably carried by a transverse shaft 28, the ends of which are journaled in the longitudinally extending horizontal channel members 29 of framework associated with the forehearth 6.

As shown in Figs. 4 and 5, the members 25 comprise pieces of refractory material 30 dove-tailed to holders 31, secured by set screws 32 to the bottom ends of the arms 26.

Being so supported by bell cranks 27 on shaft 28, members 25 may be moved into and out of closing position successively and periodically for the purpose of keeping the gathering pool enclosed as much as possible while exposing the pool at times so that the molds of the forming machine may be dipped into the glass to gather charges. Any suitable means may be provided for so operating the members 25, and in the construction illustrated, the members 25 are moved to closed position by gravity, but under the control of cams 34, arranged preferably in staggered relation on shaft 35, and engaging rollers 36 on arms 37 of bell crank 27. If desired, the weight of the arms 26 and members 25 may be partially or wholly counterbalanced by weights 38 adjustable on the outer end portions of the arms 37.

The shaft 35 is slidably mounted, extending through a suitable bearing 39 in one of the frame members 29, Figs. 1 and 3, at one of its ends, and extending at its other end into a socket 40 of a shaft 41, which in effect is a continuation of shaft 35, but is held against sliding movement in a bearing 42 mounted partly on a frame member 29, and partly on a similar parallel frame member 43 as shown in Fig. 1. A pin and slot connection indicated at 44 causes shaft 35 to be driven by shaft 41, while permitting the shaft 35 to slide laterally relative to the shaft 41.

Shaft 41 is rotated to drive shaft 35 and rotate cams 34 thereon to move the members 25 into and out of closed position, by means of a bevel gear 45 on the outer end of shaft 41, adapted to mesh with a similar bevel gear 46 on the upper end of a vertical drive shaft 47 which may be suitably journaled in, and if desired supported by, the machine 20 and driven from the table 22 thereof by means of a spur gear 48 on shaft 47 in mesh with gear 23 on the table. If the drive shaft 47 is wholly supported by the machine, as above suggested, movement of the machine into and out of operative position in known manner, will serve to connect and disconnect the drive shaft 47 and the shaft 41 by the engagement and disengagement of bevel gears 46 and 45.

The above-described means for moving the members 25 into and out of closing position serves to operate those members in timed relation to the movement of the molds of the machine toward, over and away from, the gathering pool. As previously stated, the cams 34 preferably are arranged in staggered relation on shaft 35. If so arranged, the members 25 will be periodically and successively moved to open position to provide an opening for one of the molds of the forming machine, which opening in effect moves from one side of the pool to the other with the mold to provide free access for the mold to the glass. Thus, assuming the table 22 of the forming machine to be rotated in a counterclockwise direction, as the mold 21 arrives at the advance end of the gathering pool 18 which at the time is completely closed by members 25, enough of the members 25 will be moved inwardly of the forward edge of the gathering pool and out of closed position to provide a space of sufficient width for clearance of the mold 21. As the mold continues to move over the gathering pool, the members 25 behind it will successively be returned to closed position while the members 25 in advance of the mold will be successively moved to open position so that the clearance space for the mold in effect moves with the mold over the gathering pool and insures that the gathering pool will be covered except insofar as it is necessary to expose the pool for access of the mold to the glass. As shown in Fig. 1, for example, the innermost members 25 are in open position, while the endmost members 25 are in closed position and the mold 21 is located centrally of the gathering pool 18 in its travel. Further movement of the mold over the gathering pool will be accompanied by the opening movement of the advanced endmost member 25, and subsequent movement of members 25 to the rear of the mold to closed position.

It will be understood that the opening and closing movement of the members 25 may be varied if desired by shifting cams 34 relative to shaft 35 or by changing the contour of the cams. It is preferred, however, to so arrange the cams that the minimum space for mold clearance is provided by the members 25 and the members 25 held in closed position for the maximum periods of time to confine heat to the surface of the glass in the gathering pool and so maintain the glass at the desired temperature and in good working condition.

It might be desirable in some cases to hold all the members 25 in closed position as for example when the forming machine is stopped and/or moved away from the gathering pool. That may be accomplished by laterally shifting the shaft 35 and cams 34 carried thereby to disengage the cams and rollers 36 and thus permit clockwise oscillation of bell cranks 27 and movement of the cover members 25 to closed position. Such lateral shifting of shaft 35, may be effected by means of a chain 50, Figs. 1 and 3, which passes over a sprocket wheel 51 on a shaft 52 which is threaded on its inner end portion into a stationary nut 53 on a side frame member 29. Shaft 52 is connected at its outer end to one end of a lever 54 pivoted at 55 on a suitable bracket carried by the side frame member 29, and connected at its other end to the free end of shaft 35. Thus, by pulling on the right-hand strand of chain 50, looking at Fig. 3, shaft 52 is caused to move inwardly in nut 53, thereby shifting shaft 35 outwardly and disengaging the cams 34 and their respective rollers 36. As a result, all of the members 25 move outwardly into closed position and remain in that position until the shaft 35 is shifted in the opposite direction and cams 34 and their rollers 36 again brought into engagement.

In order to reestablish the engagement of cams 34 and rollers 36, means is provided for temporarily holding arms 26 of bell cranks 27 in raised position so that the cams may pass over and into a position above the various cam rollers 36. Such means comprises a rod 57 supported at its opposite ends by levers 58 rigidly mounted on shaft 28. The end of rod 57 which passes through lever 59 is connected to a link 60 which in turn is joined to the crank arm 61 on a horizontal shaft 62 suitably journaled in a side frame member 29 and carrying a sprocket wheel 63 over which passes a chain 64.

Manipulation of chain 64 in the required manner serves to move rod 57 into engagement with all of the arms 26 of bell crank 27 to raise them upwardly into a position in which all of the members 25 are held in open position. As a result, rollers 36 are moved downwardly so that shaft 35 may be moved laterally inwardly to position cams 34 above the rollers. The operation of the mechanism controlled by chain 64 then may be reversed to return rod 57 to inoperative position and again to establish connections between cams 34 and their rollers 36.

It will readily be seen that chain 64 may be manipulated to move rod 57 into engagement with all of the crank arms 26 and thus hold the members 25 in completely open position at any time. That is of advantage in permitting free access to the entire surface of the gathering pool as may be desired.

It is to be understood that the invention is not limited to the precise form of embodiment shown in the drawings, but that various changes in the construction of the illustrated embodiment may be made without departing from the invention as defined in the appended claims.

Having thus described my invention, what I desire to claim and secure by Letters Patent is:

1. In combination with a container for a pool of molten glass from the surface of which charges of glass are gathered, a sectional cover for said container, means supporting said cover out of contact with the glass at all times, and means for periodically moving the sections of said cover respectively into and out of closed position.

2. In combination with a container for a pool of molten glass from the surface of which charges are gathered, a sectional cover for said container, means supporting said cover out of contact with the glass at all times, and means for periodically and successively moving the sections of said cover respectively into and out of closed position.

3. In combination with a container for a pool of molten glass, a mold adapted to be moved periodically into and out of position to gather charges from the surface of a pool of glass, a plurality of members for enclosing the pool, means supporting said members out of contact with the glass at all times, and means for periodically moving said members respectively to open position in timed relation to the movement of the mold into and out of position to gather charges from the pool, to provide access for the mold to the surface of the pool.

4. In combination with a container for a pool of molten glass, a mold adapted to be moved into and out of position to gather charges of glass from the surface of the pool, a plurality of members for enclosing the pool, means supporting said members out of contact with the glass at all times, and means for periodically and successively moving the members respectively into and out of closed position in timed relation to the movement of the mold toward and away from the pool to provide access for the mold to the surface of the glass of the pool.

5. In combination with a container for a pool of molten glass from the surface of which charges of glass are gathered, a plurality of members for enclosing the pool, means supporting said members out of contact with the glass at all times, means for periodically and successively moving said members respectively into and out of closed position, and means for rendering the last-named means inoperative.

6. In combination with a container for a pool of molten glass from the surface of which charges of glass are gathered, a plurality of members for enclosing the pool, means supporting said members out of contact with the glass at all times, means for periodically and successively moving said members respectively into and out of closed position, and means for rendering the last-named means inoperative.

7. In combination with a container for a pool of molten glass, a sectional cover for the pool, means supporting said cover out of contact with the glass at all times, means for periodically moving the sections of the cover respectively into and out of position to enclose the pool, and additional means for holding the sections of said cover in open position.

8. In combination with a container for a pool of molten glass from the surface of which charges of glass are gathered, a forming machine comprising a mold adapted to be moved into and out of position to gather charges of glass from the surface of the pool, a sectional cover for the pool, means supporting said cover out of contact with the glass at all times and means driven by said machine for periodically moving the sections of said cover in predetermined order into and out of position to enclose the pool.

9. In combination with a container for a pool of molten glass from the surface of which charges of glass are gathered, a plurality of members for enclosing the pool, means supporting said cover out of contact with the glass at all times, a mold adapted to be moved into and out of position to gather charges from the surface of the pool, and means for operating said members to hold one or more of them in open position while one or more of them is held in closed position to provide access for the mold to the surface of the glass of the pool.

10. In combination with a container for a pool of molten glass from the surface of which charges are gathered, a closure for the pool, a pivotal support above the pool for said closure, and means for oscillating said closure rearwardly and forwardly of the pool into open and closed positions respectively.

11. In combination with a container for a pool of molten glass from the surface of which charges are gathered, a closure for the pool, an arm carrying said closure, a pivotal mounting above the pool for said arm, means on said arm for counterbalancing the weight of said closure, and automatic means for periodically oscillating said arm to move said closure rearwardly and forwardly of the pool into open and closed positions respectively.

Signed at Hartford, Connecticut this 11th day of May, 1931.

KARL E. PEILER.